(12) United States Patent
Hayden (10) Patent No.: US 7,123,821 B1
(45) Date of Patent: Oct. 17, 2006

(54) DC MOTOR

(76) Inventor: Michael Pete Hayden, 517 Clydesdale, Hutchinson, KS (US) 67501

( * ) Notice: Subject to any disclaimer, the term of this patent is extended or adjusted under 35 U.S.C. 154(b) by 0 days.

(21) Appl. No.: 11/227,717

(22) Filed: Sep. 15, 2005

(51) Int. Cl.
*H02K 23/36* (2006.01)

(52) U.S. Cl. ...................................... 388/830; 388/837

(58) Field of Classification Search ................ 318/138, 318/254, 439, 720–724, 244–245; 388/830, 388/834, 835, 837
See application file for complete search history.

(56) References Cited

U.S. PATENT DOCUMENTS

| | | | |
|---|---|---|---|
| 3,308,371 A | 3/1967 | Studtmann, Jr. | |
| 3,560,818 A | 2/1971 | Amato | |
| 3,611,091 A | 10/1971 | Genovese | |
| 3,748,554 A | 7/1973 | McDonald | |
| 3,774,094 A * | 11/1973 | Peterson | 388/822 |
| 4,024,525 A * | 5/1977 | Baumgartner et al. | 340/648 |
| 4,055,789 A | 10/1977 | Lasater | |
| 4,064,442 A * | 12/1977 | Garron | 318/254 |
| 4,091,313 A | 5/1978 | Genovese | |
| 4,237,410 A | 12/1980 | Erickson et al. | |
| 4,584,506 A | 4/1986 | Kaszmann | |
| 5,227,702 A | 7/1993 | Nahirney | |
| 5,742,146 A | 4/1998 | Langhorst | |
| 5,912,545 A | 6/1999 | Monet et al. | |
| 6,307,345 B1 * | 10/2001 | Lewis | 318/696 |
| 6,545,444 B1 | 4/2003 | Bedini | |
| 6,717,301 B1 * | 4/2004 | DeDaran et al. | 310/68 R |

\* cited by examiner

*Primary Examiner*—Bentsu Ro
(74) *Attorney, Agent, or Firm*—Robert O. Blinn (57) ABSTRACT

A DC motor includes a power source, a stator and a rotor. Permanent magnets are mounted to either the stator or the rotor. Electromagnets are mounted to the other of either the stator or the rotor. Each electromagnet includes two coils which are each branched with a capacitor. A switching means, responding to the rotor, switches between a first mode in which the power supply is connected across a branch for energizing the coil and charging the capacitor and a second mode in which the branch terminals are closed for discharging the capacitor into the coil. The switching means and branches are arranged such that the coils of a particular electromagnet maintain the same polarity while also alternating between opposite polarities.

1 Claim, 10 Drawing Sheets

DC MOTOR

FIELD OF THE INVENTION

This invention relates to a DC motor.

BRIEF DESCRIPTION OF THE INVENTION

The present invention is a DC motor, including a power source, a stator and a rotor mounted for rotation relative to the stator about a motor axis. A set of permanent magnets is mounted to either the stator or the rotor so that the poles of the permanent magnets are equiangularly spaced about the motor axis. At least one electromagnet is mounted to the other of either the stator or the rotor such that the two poles of the electromagnet are equiangularly spaced about the motor axis. The electromagnet includes at least a first coil and a second coil which are both associated with one pole of the at least one electromagnet. The first coil is connected in series in a first branch with a first capacitor and the second coil is connected in series in a second branch with a second capacitor. A switching means responds to the rotation of the rotor and alternates between a first mode and a second mode. In the first mode, the switching means connects the first branch with the power supply causing the first coil to energize with a first polarity and the first capacitor to charge. In the first mode, the switching means also disconnects the second branch from the power supply and establishes a connection between the free terminal of the second capacitor and the second coil. This causes the second capacitor to discharge and energize the second coil with the first polarity thus reinforcing the magnetic field in the pole. In the second mode, the switching means disconnects the first branch from the power supply and establishes a connection between the free terminal of the first capacitor and the first coil causing the first coil to energize with a second, opposite polarity. Also in the second mode, the switching means connects the second branch with the power supply causing the second coil to energize with that same second, opposite polarity and the second capacitor to charge. The timing of the switching between the first mode and second mode is arranged such that the poles of the electromagnet alternately attract the approaching pole of the permanent magnet and repel the receding pole of the permanent magnet to cause powered rotation of the rotor.

Those skilled in the art will readily appreciate that, by way of example, the above described arrangement may be embodied in a DC motor having in a stator which includes a plurality of electromagnets wherein each pole of each electromagnet has at least two coil windings as described above which are each connected in a circuit including a capacitor, a power supply and commutator for controlling oscillations between the two modes as described above and wherein the rotor has an associated plurality of permanent magnets the poles of which alternate between being attracted to and being repulsed by the poles of the electromagnets of the stator as the rotor rotates to generate power.

DETAILED DESCRIPTION OF THE INVENTION

Figure 2:
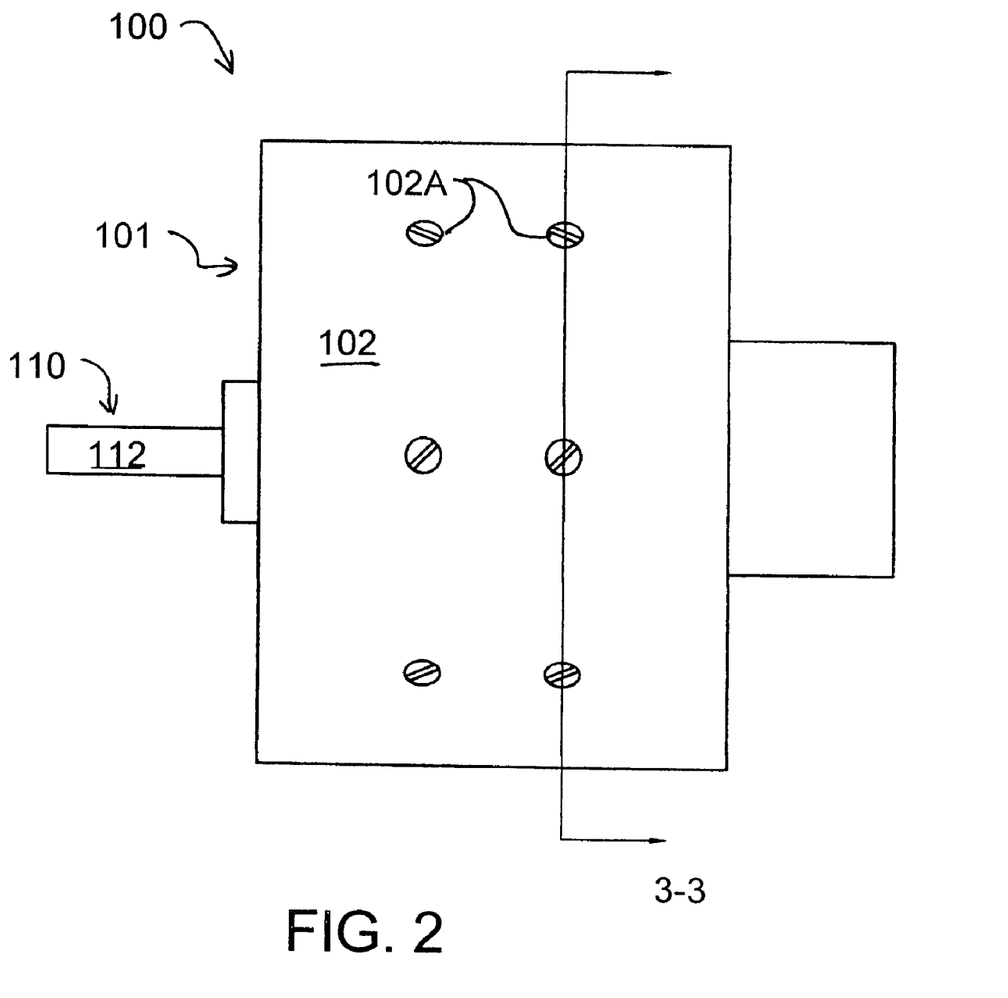
FIG. 2 is a side view of an embodiment of the motor of the present invention.
Figure 3:
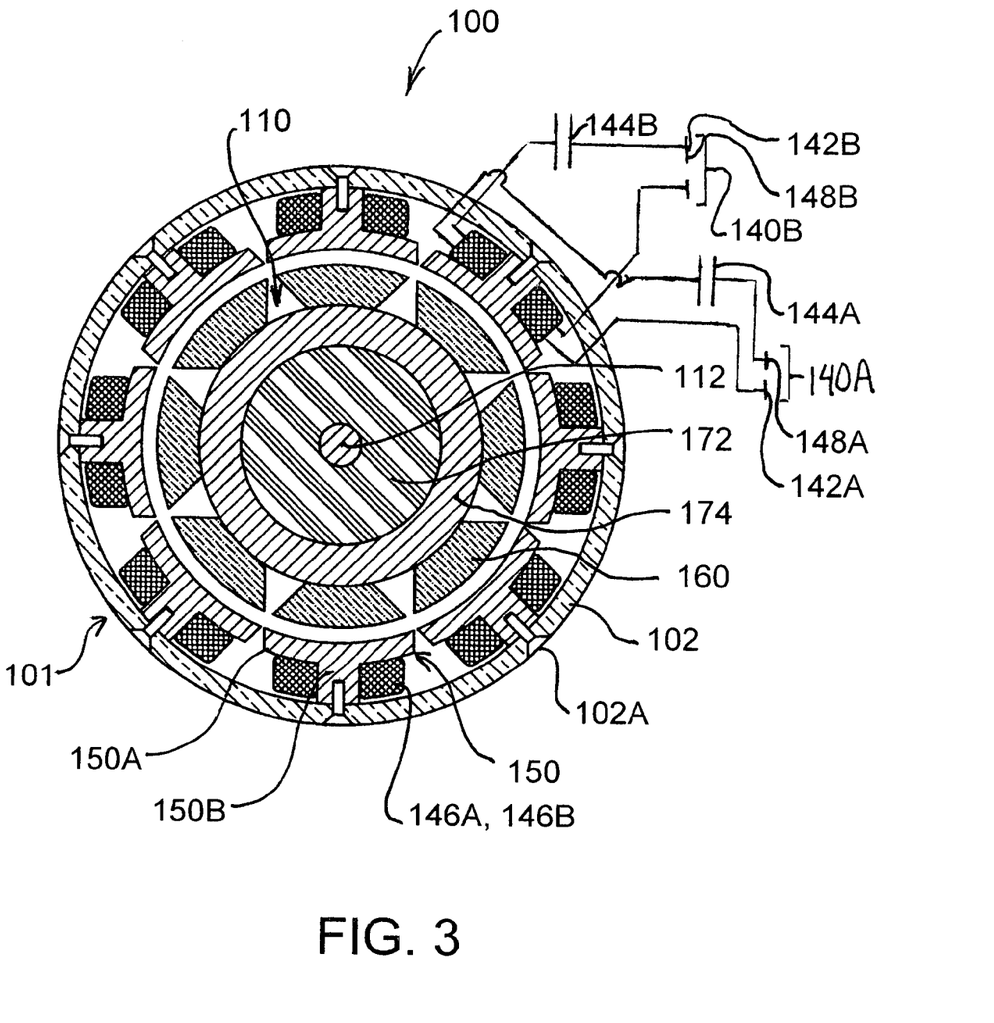
FIG. 3 is a side sectional view of an embodiment of the motor of the present invention taken from plane 3—3 of FIG. 2.
Figure 4:
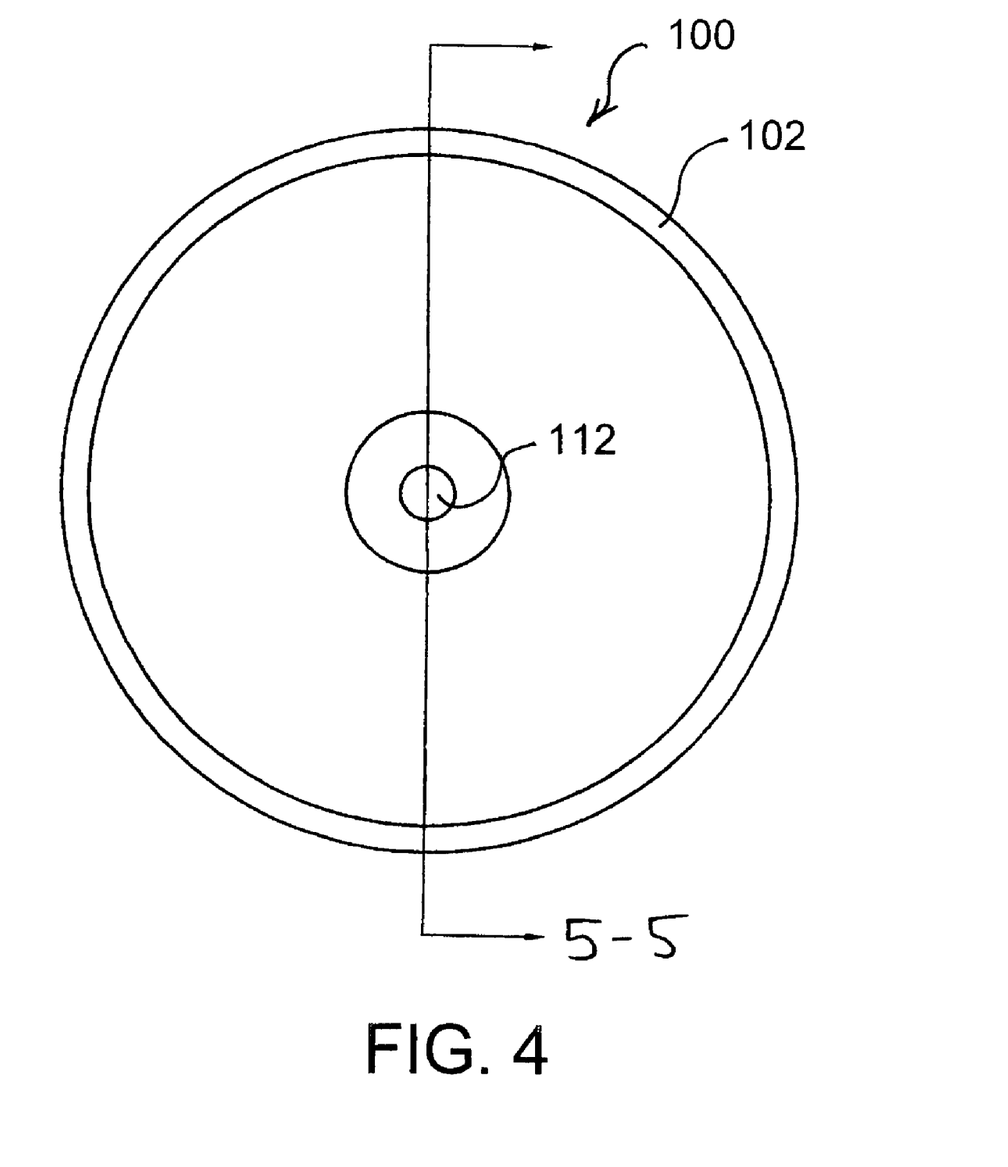
FIG. 4 is an end view of an embodiment of the motor of the present invention.

Referring to the drawings, FIGS. 1A–1D provide a series of schematic diagrams of a motor 10 of the present invention. FIGS. 2–4 provide an example configuration of a motor 100 which is intended as one embodiment of motor 10.

FIGS. 1A–1D show that, in its simplest form, motor 10 includes a rotor 12, a motor shaft 12A, a commutator 20, a power supply branch 60, a first coil branch 40A and a second coil branch 40B. Power supply branch 60 further includes a DC potential 62, a switch 64 which remains closed for purposes of FIG. 1A–1D. Power supply branch 60 terminates in a first power terminal 66A and a second power terminal 66B. First coil branch 40A includes a first terminal 42A, a capacitor 44A, a coil 46A and a second terminal 48A. Second coil branch 40B includes a first terminal 42B, a capacitor 44B, a coil 46B and a second terminal 48B. Commutator 20 includes a non-conductive area 22 which isolates three conductive areas on the surface of commutator 20, namely, a central conductive area 24, a left conductive area 26 and a right conductive area 28. Those skilled in the art will readily appreciate that non-conductive area 22 is illustrated in FIGS. 1A–1D as having a substantial amount of surface area and that in actual practice, non-conductive area 22 may be arranged to have just enough surface area to prevent electrical conduction between conductive area 24, left conductive area 26 and right conductive area 28. FIGS. 1A–1D do not illustrate all the components of motor 10. For example, the skilled reader should understand that typically, coils 46A and 46B are associated with the same pole of an electromagnet (not shown in FIGS. 1A–1D) which is preferably mounted to a stator (not shown in FIGS. 1A–1D). Further, at least one permanent magnet (not shown in FIGS. 1A–1D) is preferably mounted to rotor 12. The electromagnet associated with coils 46A and 46B and the permanent magnet are preferably arranged such that their poles alternately attract and repulse each other to cause rotation of rotor 12 and motor shaft 12A.

FIGS. 1A–1D illustrate how commutator 20 controls the sequence of connections between the terminals of power supply branch 60, first coil branch 40A and second coil branch 40B as commutator 20 rotates through four positions. Those skilled in the art should appreciate that commutator 20 is only one of many means for accomplishing the sequence of states described below. For example, a solid state timing device including a position sensor and solid state relays might be devised for accomplishing the sequence of operations described below.

Figure 1A:
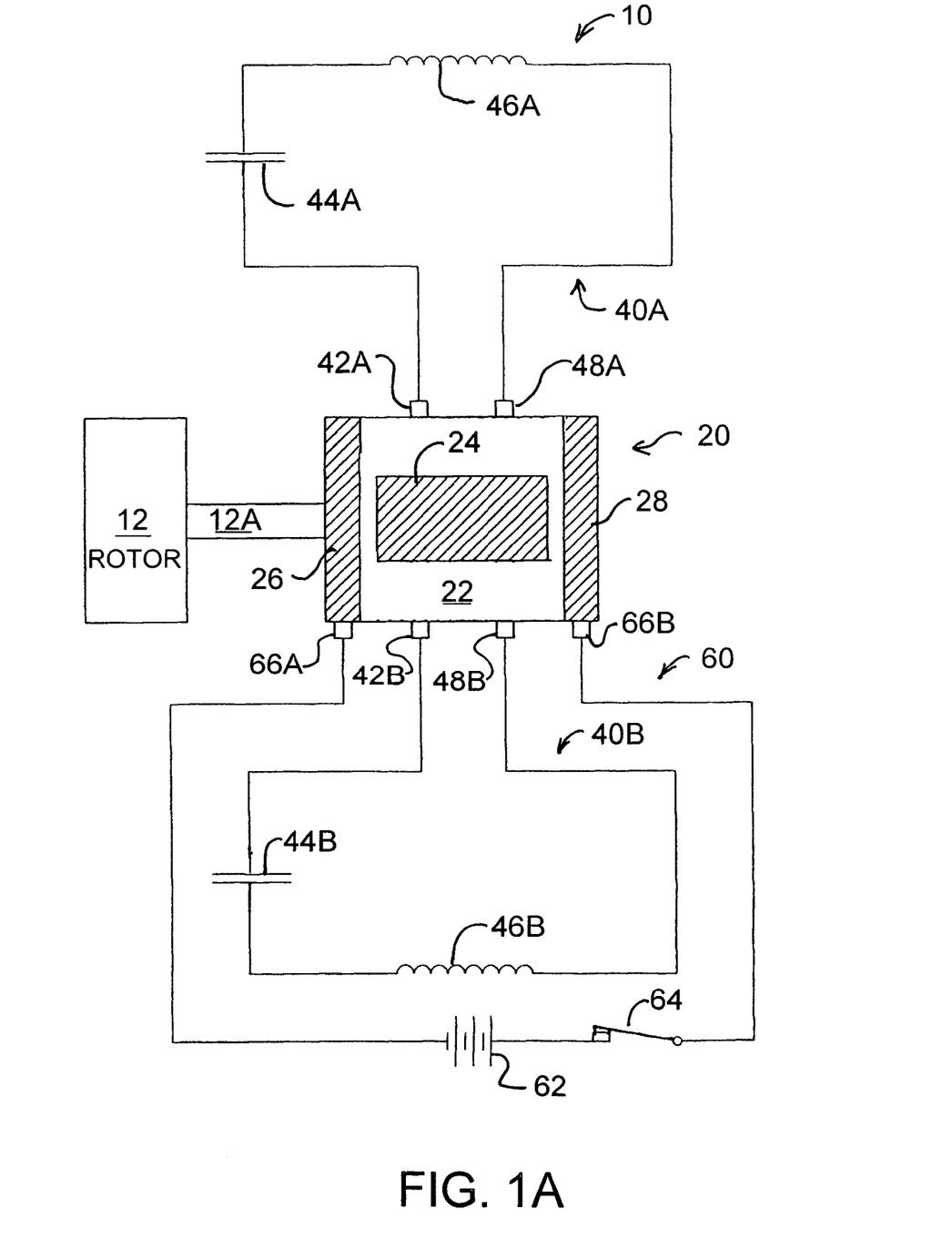
FIG. 1A is a schematic showing the coil branches for the pole of an electromagnet and the commutator of a motor of the present invention where both coil branches are isolated from the power source and both coil branches are open.

In FIG. 1A, commutator 20 may be considered as beginning a cycle of rotation in a first position. With commutator 20 in the first position, power supply branch terminals 66A and 66B are isolated from both coil branches and no connection is provided between the end terminals of either coil branch.

Figure 1B:
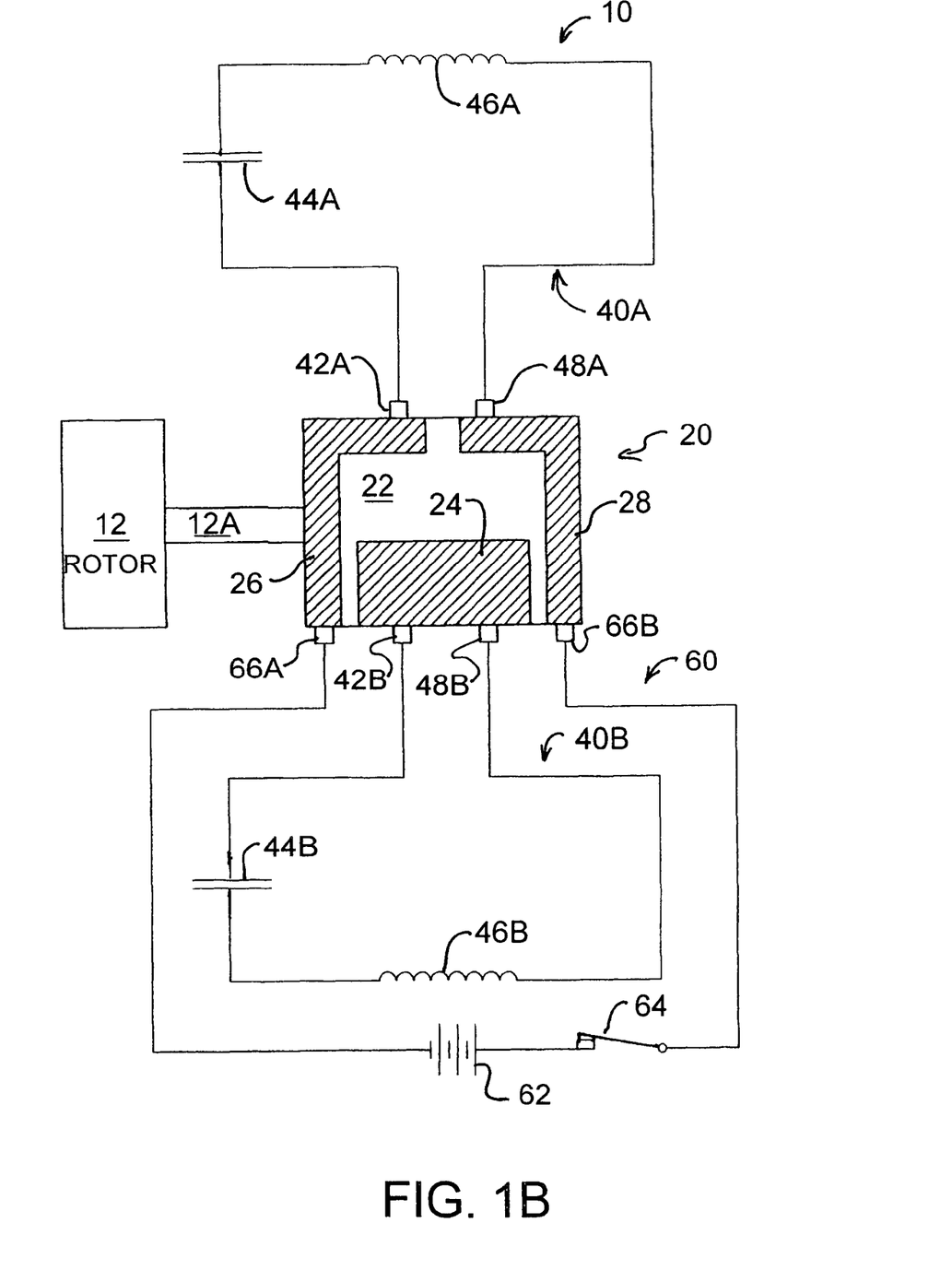
FIG. 1B is a schematic showing the coil branches for the pole of an electromagnet and the commutator of a motor of the present invention where the first coil branch is in communication with the power supply and the second coil branch is closed.

In FIG. 1B, commutator 20 has rotated in the cycle of rotation to a second position. With commutator 20 in the second-position, first terminal 66A of power supply branch 60 is connected by left conductive area 26 of commutator 20 to first terminal 42A of first coil branch 40A while second terminal 66B of power supply branch 60 is connected by right conductive area 28 to second terminal 48A of first coil branch 40A. This connection causes capacitor 44A to charge and coil 46A to energize in first coil branch 40A. At the same time, in FIG. 1B, terminals 42B and 48B of second coil branch 40B are connected by central conductive area 24. This connection closes coil branch 40B and causes capacitor 44B to discharge and thus energize coil 46B. As noted above, coils 46A and 46B are preferably arranged in the same electromagnet and they are also arranged such that during the configuration shown in FIG. 1B, both coils 46A and 46B generate the same polarity in the magnetic field.

Figure 1C:
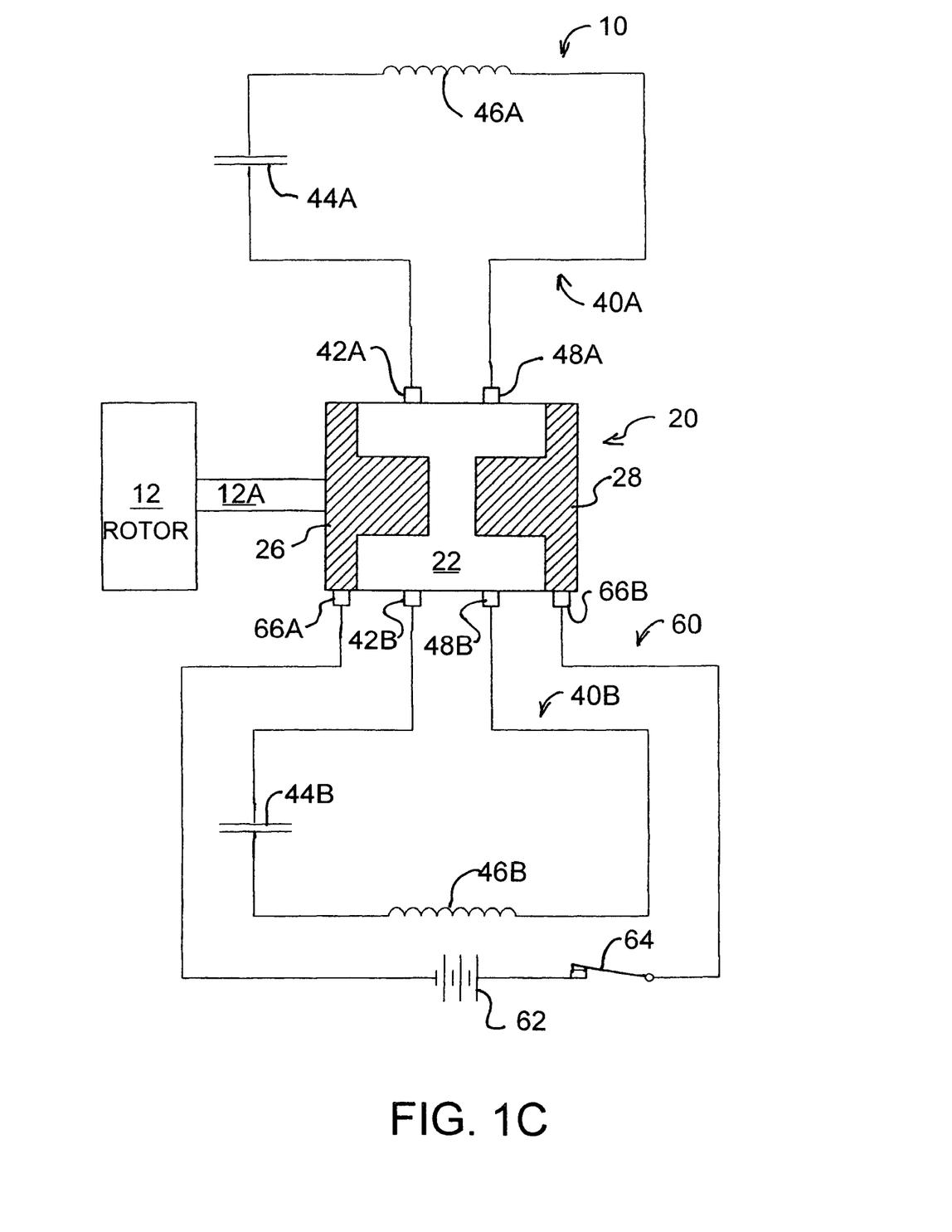
FIG. 1C is a schematic showing the coil branches for the pole of an electromagnet and the commutator of a motor of the present invention where both coil branches are isolated from the power source and both coil branches are open.

In FIG. 1C, commutator 20 has rotated to the third position. With commutator 20 in the third position, the terminals of both coil branches 40A and 40B are once again isolated from each other and from power supply branch 60. When commutator 20 is in the third position, coil branches 40A and 40B are not being energized and capacitors 44A and 44B are not discharging.

Figure 1D:
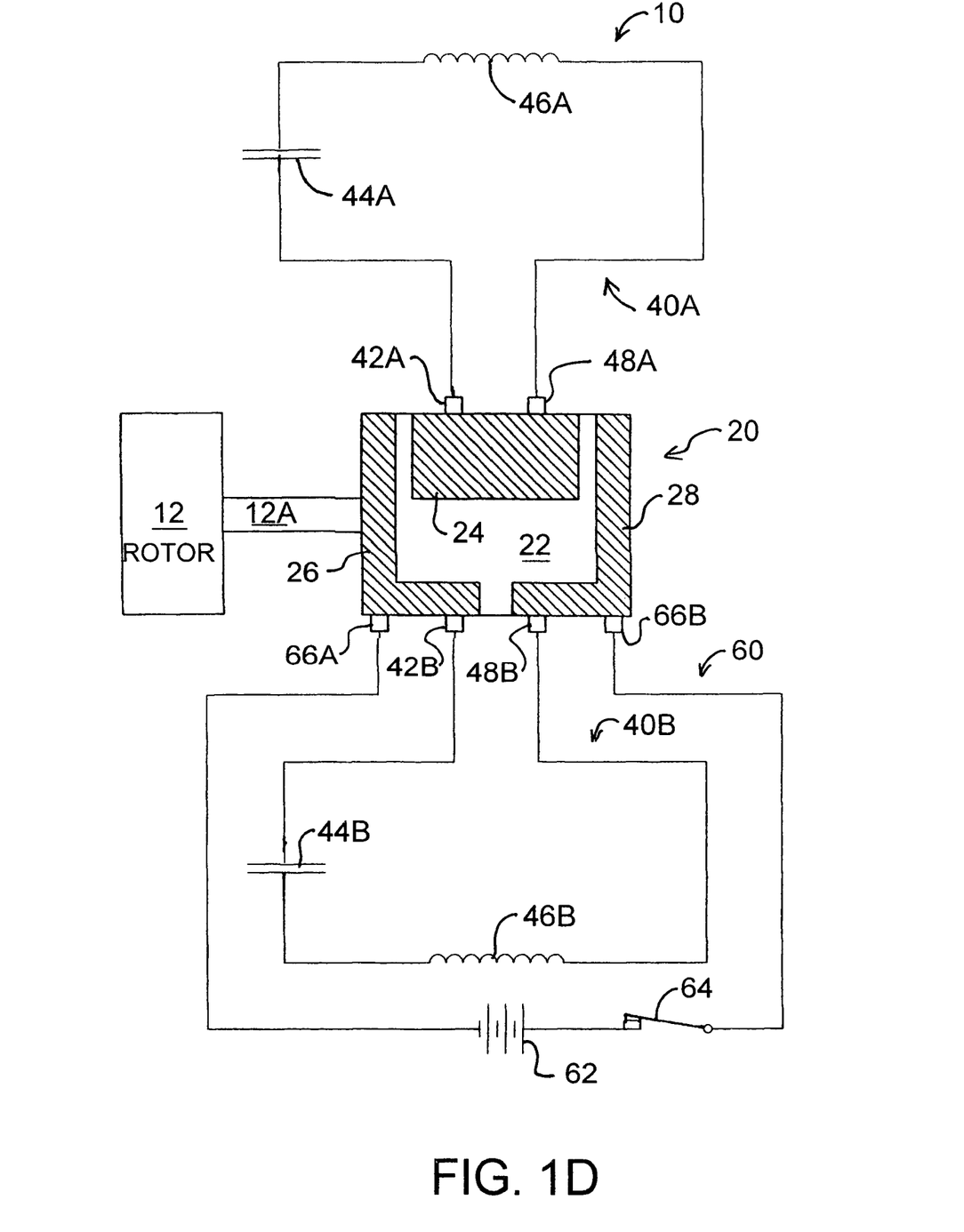
FIG. 1D is a schematic showing the coil branches for the pole of an electromagnet and the commutator of a motor of the present invention where the first coil branch is closed and the second coil branch is in communication with the power supply.

In FIG. 1D, commutator 20 has rotated to the fourth position. When in the fourth position, commutator 20 connects the terminals of power supply branch 60, first coil branch 40A and first coil branch 40B in a manner that is inverted from that of the second commutator position illustrated in FIG. 1B. When in the fourth position, first power supply branch terminal 66A is connected by left conductive area 26 to first terminal 42B of second coil branch 40B while second power supply branch terminal 66B is connected by right conductive area 28 to second terminal 48B of second coil branch 40B. These connections cause capacitor 44B to charge and coil 46B to energize with a polarity which is opposite from the polarity of coil 46B when commutator 20 was in the second position shown in FIG. 1B. At the same time, in FIG. 1D, terminals 42A and 48A of first coil branch 40A are connected by central conductive area 24. This connection closes first coil branch 40A which causes capacitor 44A to discharge and coil 46A to energize. Again, the polarity of coil 46A in the fourth commutator position is opposite of the polarity of coil 46A during the second commutator position. As commutator 20 continues to rotate it returns to the first position shown in FIG. 1A.

Accordingly, as commutator 20 rotates from the first position through the fourth position as described above, coils 46A and 46B are alternately energized or isolated and are alternately energized with polarities which alternate in polarity between the second and fourth positions described above. In the second position, coils 46A and 46B may be described as being energized with a first polarity for causing a first polarity in preferably the same pole of an electromagnet which is preferably associated with the stator. The difference being that, in the second position, coil 46A of first coil branch 40A is energized by voltage potential 62 of power supply branch 60 as capacitor 44A is charged and coil 46B of second coil branch 40B is energized with the same polarity by the discharging capacitor 44B of second coil branch 40B. In the fourth position, coils 46A and 46B may be described as being energized with a second polarity for causing a second opposite polarity in preferably the same pole of the electromagnet. Here, in the fourth position, coil 46B of second coil branch 40B is energized by voltage potential 62 of power supply branch 60 as capacitor 44B is charged and coil 46A of first coil branch 40A is energized with the same, opposite polarity by the discharging capacitor 44A of first coil branch 40A. Thus, for example, two coils common to one pole of an electromagnet of a stator, can be cyclically energized by drawing power from two different sources, namely the power supply or a previously charged capacitor connected in the same branch with the coil and, the two coils common to the one pole may be cyclically energized with alternating opposite polarities as each of the two coils alternate between receiving power from these two power sources.

The example motor of FIGS. 1A–1D may be configured such that each coil of the electromagnet includes, for example, approximately 1600 turns of 20 gauge copper wire. 20 gauge copper wire typically has approximately 10 ohms of resistance per 1000 feet. Accordingly, a single coil as described above may, for example, have a resistance of approximately between 25 and 30 ohms. The applicant has found, with a single pole motor of his own construction, that such a motor operating at 1000 RPM operates sufficiently well if a 1300 micro farad capacitor rated at 200 volts is used in the branches described above when the motor is supplied with current having a 118V input voltage. At 1000 RPM a single coil of a one pole motor and the branch connected with it will alternate between the above described modes approximately 500 times per minute or once every 120 milliseconds. Accordingly, with such a one pole motor, the capacitor of each branch associated with each coil would have a charge time and a discharge time of 120 milliseconds. It is important that the value of the capacitor be chosen such that the capacitor operates well within the elastic portion of the capacitor's total charge and discharge limits during normal operation. Such an arrangement as described above will result in a generally constant charge and discharge level during each portion of the above described cycles.

FIGS. 2–5 illustrate an example embodiment of the present motor which for clarity will be referred to as motor 100. The skilled reader should note that the numerous repetitive structures in motor 100 are indicated with a single reference number for clarity. The skilled reader should understand that generally, only one item of a set of identical elements will be indicated and described below for motor 100. As can be seen in FIGS. 2–5, motor 100 includes a stator 101 and a rotor 110. FIG. 2 shows that stator 101 has a casing 102 and a pattern of fasteners 102A and that rotor 110 has a rotor shaft 112.

Figure 5:
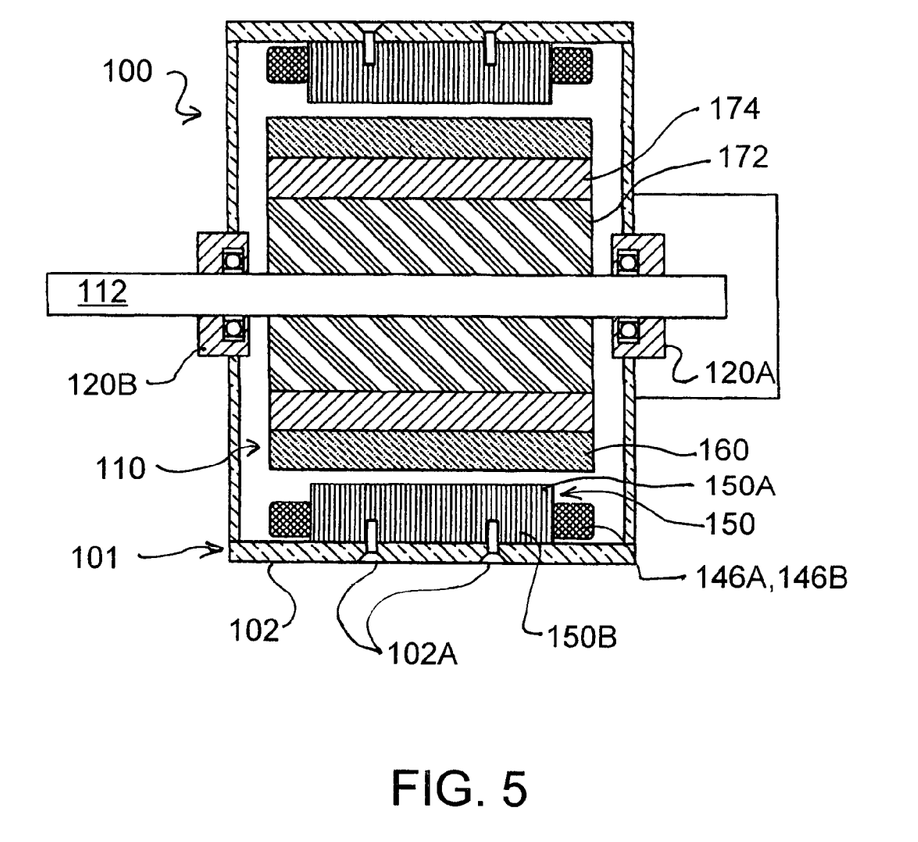
FIG. 5 is a side sectional view of an embodiment of the motor of the present invention taken from plane 5—5 of FIG. 4.

FIGS. 3–5 show other components of stator 101 and rotor 110. FIG. 3 gives a cross section taken from plane 3—3 of FIG. 2. FIG. 4 is an end view of motor 100 and FIG. 5 is a sectional view taken from plane 5—5—of FIG. 4. Rotor shaft 112 caries the other components of rotor 110. Rotor 110 primarily includes a set of eight permanent magnets 160. Permanent magnets 160 are preferably arranged so that adjacent permanent magnets 160 have alternating polarities. As can be best seen with reference to FIGS. 3 and 5, rotor shaft 112 is mounted to motor casing 102 by two bearings 120A and 120B. Shaft 112, in turn carries a hub 172 which is preferably fashioned from aluminum. Hub 172 carries an iron ring 174 which, in turn carries permanent magnets 160.

For motor 100, casing 102 forms part of the stator 101—the stationary portion of the motor. Electromagnets 150 and their associated connections should be understood as separate but identical components of motor 100. Accordingly, for clarity, features and elements associated with each of the eight electromagnets 150 will be shown and described once. The reader should understand that each of the eight electromagnets 150 have generally identical elements and connections. A pattern of eight evenly distributed electromagnets 150 are fastened by fasteners 102A to the inside wall of casing 102. Electromagnet 150 includes a shoe portion 150A and a leg portion 150B. Two coils, 146A and 146B are wound around the relatively narrow leg portion 150B of electromagnet 150. Coils 146A and 146B may be considered as corresponding to coils 46A and 46B shown in FIGS. 1A–1D. A diagram showing the branches connected to a set of coils 146A and 146B associated with one of the electromagnets is given in FIG. 3. Branch 140A may be considered as corresponding to branch 40A of FIGS. 1A–1D and branch 140B may be considered as corresponding to branch 40B of FIGS. 1A–1D. Thus capacitor 144B corresponds to capacitor 44B and so on. Contacts 142A, 148A, 142B and 148B are associated with a commutator or some other switching means for alternately connecting the pairs of contacts or connecting a power supply between the contacts as described above. As noted above, this arrangement is repeated eight times around the stator of motor 100 for each electromagnet 150.

Although FIGS. 3–5 illustrate a motor having eight electromagnets and eight permanent magnets, the reader should understand that a configuration may be devised having unequal numbers of electromagnets and permanent magnets. For example, a motor could be devised having eight electromagnets and six permanent magnets. A motor configuration may even have eight electromagnets or 7 or 9 permanent magnets.

As described above with reference to FIGS. 1A–1D, for branches 40A and 40B, branches 140A and 140B shown in FIG. 3 may, for example, be controlled by a commutator or some other switching device which repetitively cycles through the following steps: 1. (a) Close a connection between contacts 142A and 148A thus discharging capacitor 144A to energize coil 146A with a first polarity and at the same time—(b) Connect contacts 142B and 148B to the terminals of a power supply in order to charge capacitor 144B and energize coil 146B with the same first polarity. 2. (a) Connect contacts 142A and 148A to the terminals of the power supply in order to charge capacitor 144A and energize coil 146A with a second, opposite polarity, while, at the same time, (b) Close a connection between contacts 142B and 148B thus discharging capacitor 144B to energize coil 146B with the same second opposite polarity. If the timing of these steps is controlled for each electromagnet 150 in a way that corresponds to the angular position of rotor shaft 112 and thus the angular positions of permanent magnets 160, then electromagnets 150 can act to alternately attract approaching poles of permanent magnets 160 and repel receding poles of permanent magnets 160 to cause powered rotation of rotor 110 relative to stator 101. Given the internal symmetry of motor 100, it may be possible or even preferred to connect branches 140A and 140B to alternating sets of coils associated with every other electromagnet shown in FIG. 3. And accordingly, a second pair of branches similar to branches 140A and 140B maybe timed 180 degrees out of phase with the first set of branches and connected to the coils of the four remaining electromagnets to energize those coils with an opposite polarity in accordance with the steps described above.

Figure 1E:
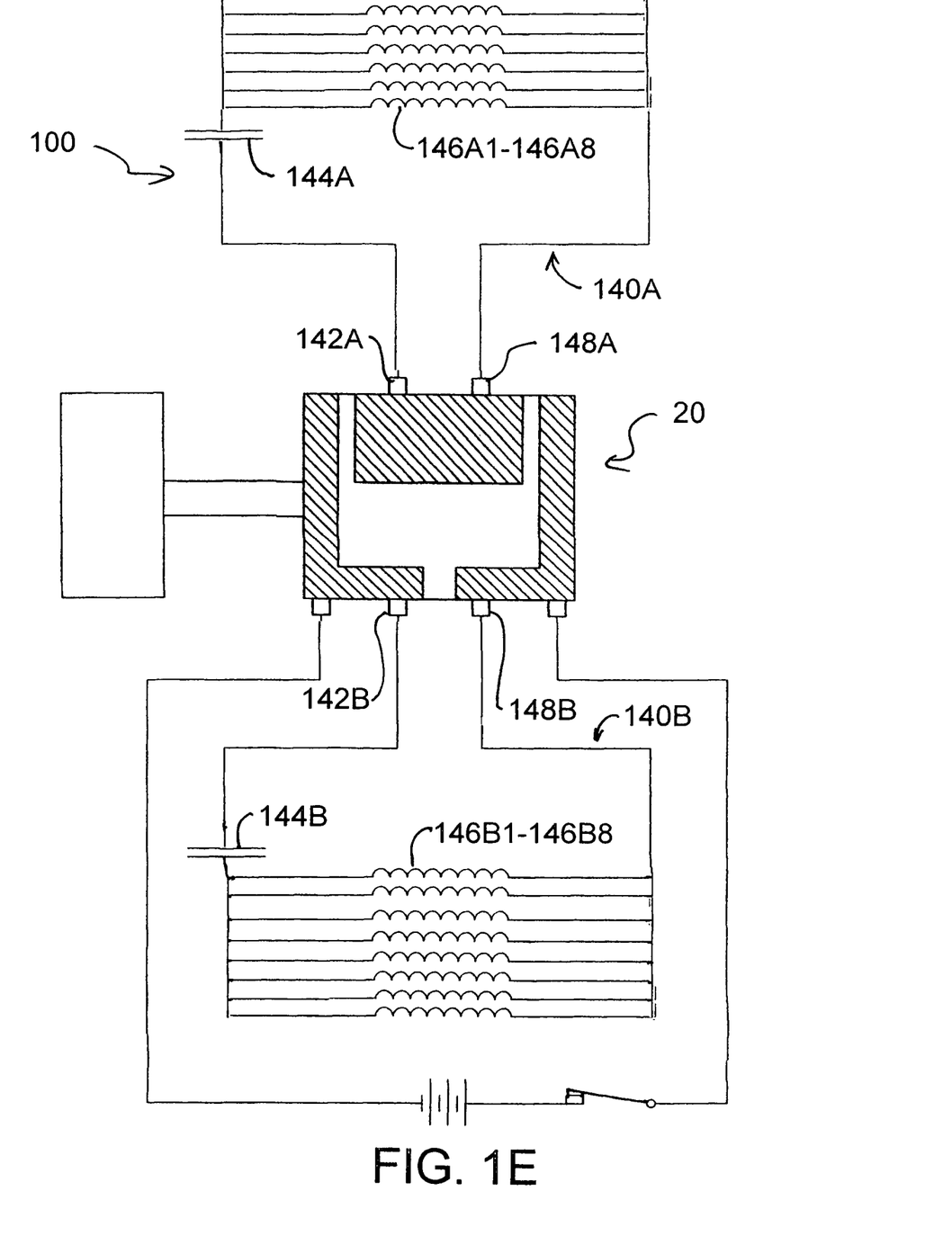
FIG. 1E is a motor schematic with a multiple coil branch arranged in parallel for a motor having eight electromagnets.
Figure 1F:
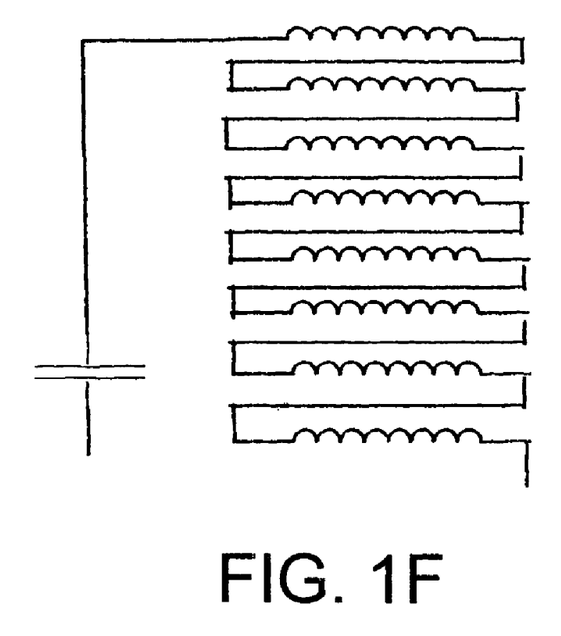
FIG. 1F is a schematic of a multiple coil branch arranged in series for a motor having eight electromagnets.
Figure 1G:
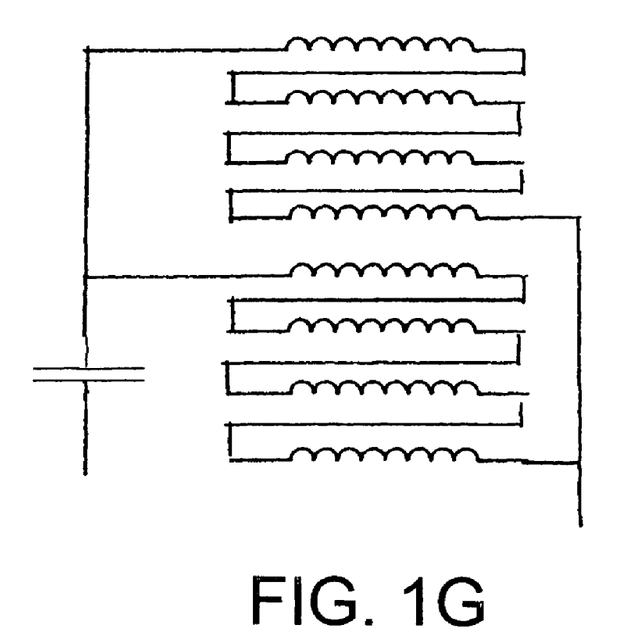
FIG. 1G is a schematic of a multiple coil branch arranged with two sets of four coils arranged in series where the sets are arranged in parallel for a motor having eight electromagnets.

FIG. 1E presents a schematic of an example arrangement with coil branches having multiple parallel coils. Multiple coil branches 140A and 140B, in this example, are arranged to accommodate eight coils which are wound upon eight electromagnet cores. Accordingly, branch 140A includes coils 146A1–146A8 and branch 140B includes coils 146B1–146B8. Each of those coils are arranged in parallel in each of the multiple coil branches and each coil is associated with a separate electromagnet 150 shown in FIG. 3. As shown in FIGS. 1F and 1G, multiple coil branches may also be arranged in series as in FIG. 1F or partially in series and partially in parallel as in FIG. 1G. Pairs of coils, for example coils 146A1 and 146B1 shown in FIG. 1E would be wound upon the same electromagnet core such that their polarities would alternate each time the commutator turned 45 degrees. The arrangement of the commutator is not shown in FIG. 1E for simplicity. The commutator would need to be arranged to reverse modes every 45 degrees of rotation instead of every 180 degrees as shown in FIGS. 1A–1D.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A DC motor, comprising, (a) a power source, a stator and a rotor mounted for rotation relative to the stator about a motor axis, (b) at least one permanent magnet mounted to either the stator or the rotor, (c) at least one electromagnet mounted to the other of either the stator or the rotor, the electromagnet including at least a first coil and a second coil, the first coil connected in series in a first branch with a first capacitor and the second coil connected in series in a second branch with a second capacitor, (d) a switching means responsive to the rotation of the rotor that alternates between a first mode and a second mode, such that:

(i) in the first mode, the switching means (aa) connects the first branch with the power supply causing the first coil to energize with a first polarity and the first capacitor to charge, and (bb) disconnects the second branch from the power supply and establishes a connection between the free terminal of the second capacitor and the second coil thus causing the second capacitor to discharge and energize the second coil with the first polarity thus reinforcing the magnetic field in the pole, and such that, (ii) in the second mode, the switching means
  (aa) disconnects the first branch from the power supply and establishes a connection between the free terminal of the first capacitor and the first coil thus causing the first capacitor to discharge and energize the first coil with the second, opposite polarity thus reinforcing the magnetic field in the pole, and
  (bb) connects the second branch with the power supply causing the second coil to energize with the same second, opposite polarity and the second capacitor to charge, (iii) the switching means also arranged such that the switching between the first mode and the second mode is timed so that the poles of the at least one electromagnet alternately attract the approaching pole of the at least one permanent magnet and repel the receding pole of the at least one permanent magnet to cause powered rotation of the rotor.

* * * * *